US010576719B2

(12) United States Patent
Liu et al.

(10) Patent No.: US 10,576,719 B2
(45) Date of Patent: Mar. 3, 2020

(54) ADHESIVE ASSEMBLY, FLEXIBLE MODULE, DISPLAY DEVICE AND MANUFACTURING METHOD FOR FLEXIBLE MODULE

(71) Applicant: BOE TECHNOLOGY GROUP CO., LTD., Beijing (CN)

(72) Inventors: Lu Liu, Beijing (CN); Mingche Hsieh, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 15/539,735

(22) PCT Filed: Jan. 10, 2017

(86) PCT No.: PCT/CN2017/070689
§ 371 (c)(1),
(2) Date: Jun. 26, 2017

(87) PCT Pub. No.: WO2017/173872
PCT Pub. Date: Oct. 12, 2017

(65) Prior Publication Data
US 2018/0093462 A1     Apr. 5, 2018

(30) Foreign Application Priority Data
Apr. 5, 2016  (CN) .......................... 2016 1 0206706

(51) Int. Cl.
*B32B 27/30*     (2006.01)
*B32B 7/05*      (2019.01)
(Continued)

(52) U.S. Cl.
CPC .............. *B32B 27/308* (2013.01); *B32B 7/05* (2019.01); *B32B 7/12* (2013.01); *G06F 1/1652* (2013.01);
(Continued)

(58) Field of Classification Search
CPC ........... G06F 1/1652; B32B 7/05; B32B 7/12; B32B 2457/20–208; C09J 7/00; C09J 11/00–08
See application file for complete search history.

(56) References Cited

U.S. PATENT DOCUMENTS 5,469,020 A      11/1995  Herrick
5,667,884 A  *   9/1997   Bolger .................. H01L 21/563
                                                    428/323
(Continued)

FOREIGN PATENT DOCUMENTS

CN       101290445 A    10/2008
CN       103955306 A     7/2014
(Continued)

OTHER PUBLICATIONS

CN103955306A translation (Year: 2014).*
(Continued)

*Primary Examiner* — Scott R. Walshon
*Assistant Examiner* — Jasper Saberi
(74) *Attorney, Agent, or Firm* — Calfee, Halter & Griswold LLP

(57) ABSTRACT

This disclosure relates to the field of display technologies, and in particular to an adhesive assembly, a flexible module, a display device and a manufacturing method of a flexible module. The adhesive assembly includes an adhesive base layer, which is arranged between two modules. The adhesive base layer includes a bonding region and a bending load buffer region, the bonding region being used for bonding the two modules, and a bending stress in the bending load buffer region being smaller than that in the bonding region. When two modules are bonded by such an adhesive assembly, the bending stress in the bending load buffer region and corresponding module portion is smaller than that in the bonding region and corresponding module portion for the whole flexible module, which reduces bending stress in the mod- (Continued)

ules as a whole and facilitates spread and application of the flexible module.

17 Claims, 2 Drawing Sheets

(51) Int. Cl.
*B32B 7/12* (2006.01)
*G09F 9/30* (2006.01)
*G06F 1/16* (2006.01)

(52) U.S. Cl.
CPC ............ *G09F 9/30* (2013.01); *B32B 2457/20* (2013.01); *G02F 2201/50* (2013.01)

(56) References Cited

U.S. PATENT DOCUMENTS

| | | | | |
|---|---|---|---|---|
| 5,872,051 | A * | 2/1999 | Fallon | B23K 1/0016 438/616 |
| 2006/0154078 | A1 | 7/2006 | Watanabe et al. | |
| 2009/0035566 | A1 | 2/2009 | Huang et al. | |
| 2012/0050075 | A1 * | 3/2012 | Salmon | G06F 1/1626 341/20 |
| 2014/0192463 | A1 * | 7/2014 | Jung | G06F 1/1601 361/679.01 |
| 2015/0181731 | A1 * | 6/2015 | Lin | B32B 37/12 361/749 |
| 2015/0192951 | A1 * | 7/2015 | Chong | G06F 1/1601 359/894 |
| 2015/0310776 | A1 * | 10/2015 | Lee | G06F 1/1652 345/173 |
| 2017/0003536 | A1 | 1/2017 | Chen et al. | |
| 2017/0213486 | A1 | 7/2017 | Zhou | |

FOREIGN PATENT DOCUMENTS

| | | |
|---|---|---|
| CN | 103985321 A | 8/2014 |
| CN | 104915064 A | 9/2015 |
| CN | 204808776 U | 11/2015 |
| CN | 105206649 A | 12/2015 |
| CN | 105702170 A | 6/2016 |
| EP | 1584657 A1 | 10/2005 |

OTHER PUBLICATIONS

CN103955306A English translation (Year: 2014).*
Second Office Action for Korean Patent Application No. 201610121988.6 dated Mar. 30, 2018.
First Office Action for Chinese Patent Application No, 201610206706.2 dated Nov. 29, 2017.
Search Report for international Patent Application No, PCT/CN2017/070689 dated Mar. 30, 2017.
Notice of Examination for Chinese Patent Application No. 201610206706.2 dated Oct. 28, 2019.
Extended search report for European Patent Application No. 17730346.8 dated Nov. 22, 2019.

* cited by examiner

ADHESIVE ASSEMBLY, FLEXIBLE MODULE, DISPLAY DEVICE AND MANUFACTURING METHOD FOR FLEXIBLE MODULE

RELATED APPLICATIONS

The present application is the U.S. national phase entry of PCT/CN2017/070689, with an international filling date of Jan. 10, 2017, which claims the benefit of Chinese Patent Application No. 201610206706.2 filed on Apr. 5, 2016, the entire disclosure of which is incorporated herein by reference.

FIELD OF THE DISCLOSURE

This disclosure relates to the field of display technologies, and in particular to an adhesive assembly, a flexible module, a display device and a manufacturing method for a flexible module.

BACKGROUND

At present, flexible display modules are usually multilayered film structures with an overall module thickness of 400-600 μm. Functional films need to adhere to each other via an optical adhesive, for example, as shown in FIG. 1, a first module portion 3 and a second module portion 4 are completely bonded together via an adhesive base layer 1, which thickens the whole module. However, the whole module obtained in this way has a greater bending stress, which may not be adapted to requirements of a flexible product and mechanism design. Besides, an excessive bending stress will cause stripping of the optical adhesive and damage to functions of the functional films.

SUMMARY

In order to reduce the bending stress between two modules in a flexible module, an adhesive assembly is provided in an embodiment of the present disclosure, which comprises an adhesive base layer configured to be arranged between two modules to connect the two modules. The adhesive base layer comprises a bonding region and a bending load buffer region, the bonding region being used for bonding the two modules, and a bending stress in the bending load buffer region being smaller than that in the bonding region.

In some embodiments, the adhesive base layer is provided with at least one through hole, and the bending load buffer region comprises a region of the adhesive base layer where the through hole is located.

In some embodiments, a material of the bending load buffer region comprises a filler having lubrication characteristics.

In some embodiments, the filler having lubrication characteristics is provided within the at least one through hole.

In some embodiments, when the adhesive assembly connects the two modules, the filler contacts the two modules.

In some embodiments, the filler comprises at least one selected from a group consisting of a liquid lubricant material, a semi-solid lubricant material and a solid lubricant material.

In some embodiments, the filler comprises at least one selected from a group consisting of round ball structures having a nano-scaled or micron-scaled diameter and grease.

In some embodiments, the filler comprises conductive gold balls.

In some embodiments, the adhesive base layer is provided with a plurality of through holes distributed in an array.

In some embodiments, a material of the bonding region comprises an optical adhesive, and protective films are provided on an upper surface and a lower surface of the adhesive base layer respectively.

A flexible module is provided in another embodiment of the present disclosure, comprising a first module portion and a second module portion. The flexible module further comprises the adhesive assembly according to any of the above embodiments. The first module portion and the second module portion adhere to each other via the adhesive assembly. The flexible module provided in this embodiment can be a flexible display module applied to a display device.

In some embodiments, the first module portion and the second module portion have a same thickness.

A display device is provided in yet another embodiment of the present disclosure, comprising the flexible module according to the preceding embodiments.

In some embodiments, the display device comprises a display substrate, the display substrate comprising a non-display region, and an orthogonal projection of the bending load buffer region of the adhesive base layer on the display substrate is located within the non-display region.

A manufacturing method of a flexible module is provided in still another embodiment of the present disclosure, comprising steps as follows:

performing a patterning process by punching holes in an adhesive base layer to form a bonding region and a bending load buffer region of the adhesive base layer, the bending load buffer region comprising a region where a through hole formed in the adhesive base layer is located, and the rest region being the bonding region of the adhesive base layer, a bending stress in the bending load buffer region being smaller than that in the bonding region, attaching a first surface of the adhesive base layer to a first module portion, and attaching a second surface of the adhesive base layer opposite to the first surface to a second module portion, such that the first module portion and the second module portion adhere to each other.

In some embodiments, the manufacturing method further comprises, prior to attaching a first surface of the adhesive base layer to a first module portion, adding a filler within the holes in the adhesive base layer, the filler comprising at least one selected from a group consisting of a liquid lubricant material, a semi-solid lubricant material and a solid lubricant material.

In some embodiments, the filler comprises at least one selected from a group consisting of round ball structures having a nano-scaled or micron-scaled diameter and grease.

In some embodiments, the filler comprises conductive gold balls.

Further, protective films are provided on the first surface and the second surface of the adhesive base layer respectively. The step of performing a patterning process by punching holes in an adhesive base layer comprises, performing a patterning process by punching holes in both the adhesive base layer and the protective films simultaneously. The manufacturing method further comprises, prior to attaching a first surface of the adhesive base layer to a first module portion, stripping the protective film on the first surface of the adhesive base layer, and prior to attaching a second surface of the adhesive base layer opposite to the first surface to a second module portion, stripping the protective film on the second surface of the adhesive base layer.

Further, in some embodiments, the step of performing a patterning process by punching holes in an adhesive base layer comprises, punching the adhesive base layer through the protective films by using a punching die with a pillar, so as to form a plurality of through holes distributed in an array.

DETAILED DESCRIPTION OF EMBODIMENTS

Embodiments of the present disclosure will be further described below in detail with reference to the drawings and the examples. The embodiments below are provided to illustrate the present disclosure, instead of restricting the scope of the invention.

In the description of this disclosure, unless otherwise specified, the term "a plurality of" means two or more. Orientation or positional relationships indicated by terms such as "upper", "lower", "left", "right", "inner", "outer", "front", "rear", "head" and "tail" are based on the accompanying drawings, and the terms are only used for depicting the embodiments of the present disclosure and simplifying the description, rather than indicating or implying that the related devices or elements must have particular orientations or be constructed or operated in a particular orientation, so they cannot be construed as limiting the present invention.

Besides, terms such as "first", "second" and "third" are only used for descriptive purposes and should not be construed as indicating or implying relative importance. Terms such as "install", "join" and "connect" should be understood in a broad sense. For example, they may refer to bonding, or detachable connection, or integral connection. They can also refer to mechanical connection, or electrical connection; and they can still refer to direct connection or indirect connection via an intermediate medium. For those having ordinary skills in the art, the specific meanings of the above terms in this disclosure can be understood depending on particular circumstances.

In the description below, the following reference signs may be used:

1: adhesive base layer; 2: protective film; 3: first module portion; 4: second module portion; 11: bending load buffer region; 12: bonding region; 13: filling; 31: circular polarizer; 32: display screen; 33: graphite sheet; 41: protective layer; 42: adhesive layer; 43: touch portion.

Figure 1:
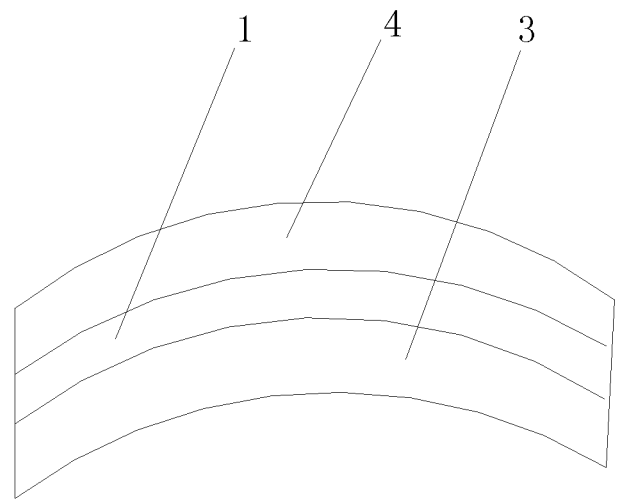
FIG. 1 is a schematic view of an existing module when it is bent.
Figure 2:
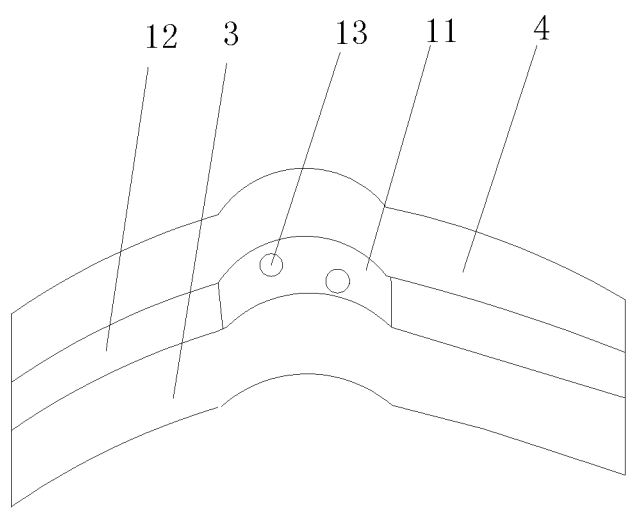
FIG. 2 is a schematic view of a flexible module according to an embodiment of the present disclosure when it is bent.
Figure 3:
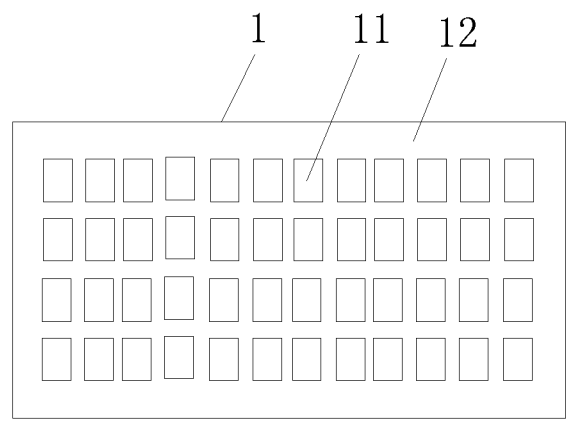
FIG. 3 is a plan view of an adhesive assembly according to an embodiment of the present disclosure.
Figure 4:
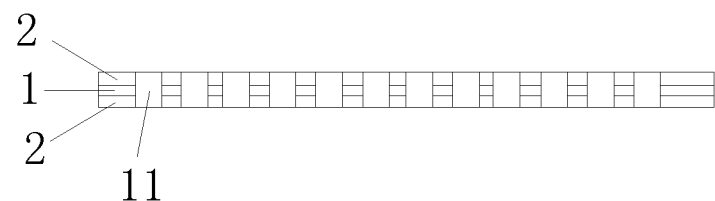
FIG. 4 is a section view of an adhesive assembly according to an embodiment of the present disclosure.

As shown in FIGS. 2-4, the adhesive assembly provided in this embodiment comprises an adhesive base layer 1 arranged between two modules 3, 4 to connect the two modules. The adhesive base layer 1 comprises a bonding region 12 and a bending load buffer region 11, the bonding region 12 being used for bonding the two modules, and a bending stress in the bending load buffer region 11 being smaller than that in the bonding region 12.

As the bending stress in the bending load buffer region 11 is smaller than that in the bonding region 12, when the whole flexible module is bent after two modules are bonded by using such an adhesive assembly, for the whole flexible module, the bending stress in the bending load buffer region 11 and corresponding module portion would be smaller than that in the bonding region 12 and corresponding module portion. Therefore, as compared to an adhesive assembly with bonding regions all over it or a whole flexible module comprising such an adhesive assembly in the prior art, the adhesive assembly provided in this embodiment and a whole flexible module using the adhesive assembly have a generally reduced bending stress.

Specific forms of the bonding region 12 and the bending load buffer region 11 in this embodiment are not exclusive. They can be arranged upon actual needs, as long as the bending stress in the bending load buffer region 11 is smaller than that in the bonding region 12.

The bonding region 12 is used for fixedly bonding two modules. Since the bending stress in the bonding region 12 is relatively greater, it is difficult for the two modules connected by the adhesive assembly to be displaced with respect to each other at a place of the bonding region 12 when being bent, or it can be considered that portions of the two modules corresponding to the position of the bonding region 12 are bent synchronously such that they have a same bending degree.

When two modules are connected by the adhesive assembly, the bending load buffer region 11 will also be located between the two modules. Since the bending stress in the bending load buffer region 11 is relatively smaller, the two modules will be displaced with respect to each other at a place of the bending load buffer region 11 when the two modules being bent (i.e., as a result, the two modules may not be bonded together completely), or it can be considered that portions of the two modules corresponding to the place of the bending load buffer region 11 would be freely bent respectively, which may lead to different bending degrees.

To be more specific, the bending load buffer region 11 can be designed in many different forms. For example, the bending load buffer region 11 can comprise a through hole in the adhesive base layer 1. Further, some non-viscous materials or materials with little adhesiveness can be added into the through holes (as a result, a bonding force between the bending load buffer region 11 and the two modules is smaller than that for the bonding region 12 during the bending, such that the bending stress in the bending load buffer region 11 and the corresponding module portion is smaller than that in the bonding region 12 and the corresponding module portion). In some embodiments, some filler 13 with lubrication characteristics are added into the through holes, and the fillers 13 with lubrication characteristics can contact the two modules and serve as a lubricant, thereby facilitating reduction of the bending stress for the whole flexible module connected through the adhesive assembly. Alternatively, the fillers may directly fill part of the bonding region 12 to change the viscosity of the corresponding bonding region, thereby forming a bending load buffer region. By doing this, the bending load buffer region 11 can be formed without a punching process.

In some embodiments, the adhesive base layer 1 may be provided with at least one through holes. The bending load buffer region 11 comprises a region of the adhesive base layer 1 where the through holes are located. The bonding region 12 is defined as a region of the adhesive base layer 1 other than the bending load buffer region. When there are a plurality of through holes, the through holes can be distributed in an array in the adhesive base layer 1, such that the bending stress is further dispersed, which prevents the adhesive material from being stripped.

Further, in some embodiments, within the at least one through holes, there may be provided with a filler 13 having lubrication characteristics and configured for contacting the two modules. The filler 13 comprises one or a combination of any of a liquid lubricant material, a semi-solid lubricant material and a solid lubricant material.

The liquid lubricant material can be understood as a liquid lubricant that has fluidity. The semi-solid lubricant material can be understood as a soap based or non-soap based synthetic material. The solid lubricant material can be understood as a solid structure having lubrication characteristics. For example, the filler 13 can comprise round ball structures having a nano-scaled or micron-scaled diameter and/or grease. In some embodiments, the filler 13 may be conductive gold balls, which can reduce influence by capacitances of the display screen in the module on the touch control.

Moreover, in some embodiments, the bending load buffer region 11 of the adhesive base layer 1 corresponds to and overlaps a non-display region of the display screen. For example, it can correspond to a PDL region (i.e., a pixel defining region between two adjacent pixel units) of a display area, which can avoid influencing the display effect.

In some embodiments, a material of the bonding region 12 comprises an optical adhesive (OCA), and protective films 2 are provided on an upper surface and a lower surface of the adhesive base layer 1 respectively. A material of the protective films 2 can be a PE (polyethylene) material or other plastic materials. The protective films 2 can be stripped when the adhesive assembly is used for connecting two modules.

Figure 5:
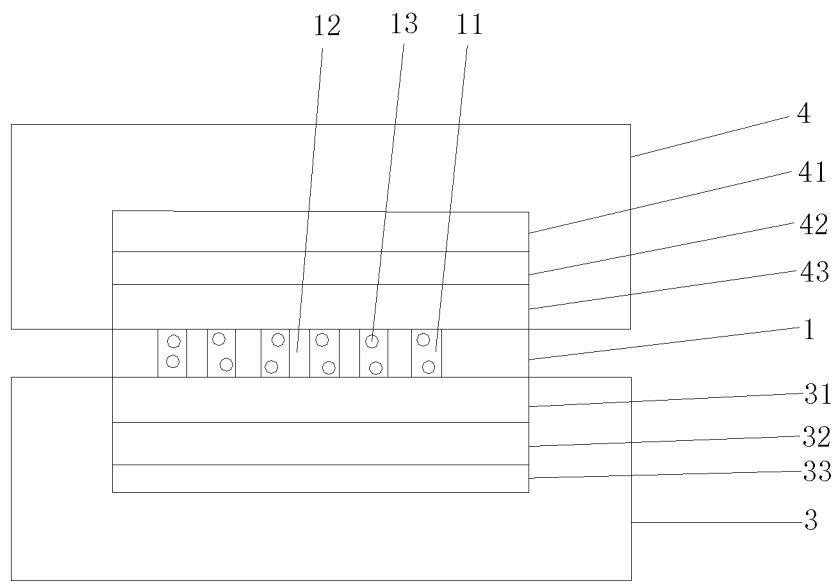
FIG. 5 is a schematic structure view of a flexible module according to another embodiment of the present disclosure.

As shown in FIG. 5, a flexible module is provided in another embodiment of the present disclosure, comprising a first lower module portion 3 and a second upper module portion 4. The flexible module can be a flexible display module of a display device and it further comprises the adhesive assembly according to any of the preceding embodiments. The first module portion 3 and the second module portion 4 adhere to each other via the adhesive assembly.

As shown in FIG. 5, the first module portion 3 comprises a graphite sheet 33, a display screen 32 and a circular polarizer 31 arranged sequentially from bottom to top. The second module portion 4 comprises a touch portion 43, an adhesive layer 42 and a protective layer 41 arranged sequentially from bottom to top. The adhesive assembly is arranged between the circular polarizer 31 and the touch portion 43. The adhesive assembly comprises an adhesive base layer 1 between the two modules 3, 4, and the adhesive base layer 1 comprises a bonding region 12 and a bending load buffer region 11, a bending stress in the bending load buffer region 11 being smaller than that in the bonding region 12. When the adhesive assembly is bent, the bending stress in the bending load buffer region 11 is smaller than that in the bonding region 12, therefore, when the whole flexible module is bent after the two modules are bonded by using such an adhesive assembly, for the whole flexible module, the bending stress in the bending load buffer region 11 and the corresponding module portion is smaller than that in the bonding region 12 and the corresponding module portion. Accordingly, as compared with a flexible module connected by an adhesive with bonding regions all over it, the flexible module comprising the adhesive assembly provided in the embodiments of the present disclosure has a generally reduced bending stress, which reduces the risks of stripping of the adhesive and damage to functions of the module.

The first module portion 3 and the second module portion 4 may have either a same thickness or different thicknesses. Likewise, the first module portion 3 and the second module portion 4 may be made of either a same material or different materials, which will not be limited here. As for the distribution of the bending load buffer region 11 and the specific forms of the filler 13, detailed illustration has been provided above, which will not be repeated here for simplicity.

A display device is provided in yet another embodiment of the present disclosure, comprising the flexible module according to the preceding embodiments. In this case, the flexible module is a flexible display module.

The display device comprises a display substrate, the display substrate comprising a non-display region. An orthogonal projection of the bending load buffer region 11 of the adhesive base layer on the display substrate is located within the non-display region. In other words, the bending load buffer region 11 of the adhesive base layer 1 corresponds to and overlaps the non-display region of the display substrate in a vertical direction, which avoids influencing the display effect. Meanwhile, the display device has the same beneficial effects as the flexible module according to the preceding embodiments. The display device can be any electronic device applicable to a flexible module, such as a handset, a tablet, a computer.

A manufacturing method of a flexible module is provided in still another embodiment of the present disclosure, in which the adhesive assembly according to any of the above embodiments is applied. The manufacturing method may comprise steps as follows:

S1, performing a patterning process by punching holes in an adhesive base layer 1 to form a bonding region and a bending load buffer region of the adhesive base layer, the bending load buffer region comprising a region where a through hole formed in the adhesive base layer is located, and the rest region being the bonding region of the adhesive base layer, a bending stress in the bending load buffer region being smaller than that in the bonding region, S2, attaching a first surface of the adhesive base layer 1 to a first module portion 3, S3, attaching a second surface of the adhesive base layer 1 opposite to the first surface to a second module portion 4, such that the first module portion 3 and the second module portion 4 adhere to each other.

As can be appreciated, the adhesive assembly is provided with a bending load buffer region 11, so the two modules will not be completely bonded together, and portions of the two modules corresponding to the bending load buffer region 11 can be bent freely, which can reduce the bending stress in the modules as a whole.

In other embodiments, the manufacturing method may further comprise: prior to attaching a first surface of the adhesive base layer to a first module portion, adding a filler within the holes in the adhesive base layer, the filler comprising one or a combination of any of a liquid lubricant material, a semi-solid lubricant material and a solid lubricant material. In other words, in this case, the material of the bending load buffer region comprises the filler. The filler can be a non-viscous material or a material with little adhesiveness. Specific information about the filler 13 that can be added can be referred to above, which will not be repeated here for simplicity.

In some embodiments, protective films 2 are provided on the first surface and the second surface of the adhesive base layer 1 respectively. In this case, in step S1, performing a patterning process by punching holes in an adhesive base layer comprises: performing a patterning process by punching holes in both the adhesive base layer and the protective films simultaneously. For example, the adhesive base layer 1 is punched through the protective films 2 by using a punching die with pillars, so as to generate a plurality of through holes distributed in an array. Besides, in step S2, the method further comprises, prior to attaching a first surface of the adhesive base layer 1 to a first module portion 3, stripping the protective film 2 on the first surface of the adhesive base layer 1. In step S3, the method further comprises, prior to attaching a second surface of the adhesive base layer 1 opposite to the first surface to a second module portion 4, stripping the protective film 2 on the second surface of the adhesive base layer 1.

The embodiments of the present disclosure are not intended to be exhaustive or limit the invention to the embodiments disclosed, but instead, they are only provided for giving examples and illustrative purposes. Many modifications and variations are obvious for those having ordinary skills in the art. The embodiments are selected and described to better explain principles and applications of the present disclosure, and help those having ordinary skills in the art to understand the present disclosure so as to design various embodiments with various amendments adapted to particular usages. In the claims, the words "comprise" and "comprising" do not exclude the presence of elements or steps other than those listed in the claims. The wording "a" or "an" preceding an element does not exclude the presence of a plurality of such elements. The mere fact that certain measures are recited in mutually different dependent claims does not indicate that a combination of these measures cannot be used to advantage.

The invention claimed is:

1. An adhesive assembly comprising an adhesive base layer, wherein the adhesive base layer is arranged between two modules to connect the two modules,
    wherein the adhesive base layer comprises a bonding region and a bending load buffer region, wherein the bonding region is used for bonding the two modules, and wherein a bending stress in the bending load buffer region is smaller than that in the bonding region,
    wherein the adhesive base layer comprises at least one through hole in the bending load buffer region, the at least one through hole penetrates through the adhesive base layer, stops at interfaces between the adhesive base layer and the two modules, and is filled with a filler having lubrication characteristics.

2. The adhesive assembly according to claim 1, wherein when the adhesive assembly connects the two modules, the filler contacts the two modules.

3. The adhesive assembly according to claim 1, wherein the filler comprises at least one selected from the group consisting of a liquid lubricant material, a semi-solid lubricant material and a solid lubricant material.

4. The adhesive assembly according to claim 1, wherein the filler comprises at least one selected from the group consisting of round ball structures having a nano-scaled diameter, round ball structures having a micron-scaled diameter and grease.

5. The adhesive assembly according to claim 1, wherein the filler comprises conductive gold balls.

6. The adhesive assembly according to claim 1, wherein the adhesive base layer is provided with a plurality of said through holes distributed in an array.

7. The adhesive assembly according to claim 1, wherein a material of the bonding region comprises an optical adhesive, and protective films are provided on an upper surface and a lower surface of the adhesive base layer respectively.

8. A flexible module, comprising a first module portion and a second module portion, wherein the flexible module further comprises the adhesive assembly according to claim 1, and wherein the first module portion and the second module portion adhere to each other via the adhesive assembly.

9. The flexible module according to claim 8, wherein the first module portion and the second module portion have a same thickness.

10. A display device comprising the flexible module according to claim 8.

11. The display device according to claim 10, wherein the display device comprises a display substrate, the display substrate comprising a non-display region, wherein an orthogonal projection of the bending load buffer region of the adhesive base layer on the display substrate is located within the non-display region.

12. A manufacturing method for a flexible module, comprising:
    performing a patterning process by punching at least one through hole in a bending load buffer region of an adhesive base layer, the adhesive base layer further comprises a bonding region, and a bending stress in the bending load buffer region is smaller than that in the bonding region,
    filling the at least one through hole in the adhesive base layer with a filler having lubrication characteristics,
    attaching a first surface of the adhesive base layer to a first module portion;
    attaching a second surface of the adhesive base layer opposite to the first surface to a second module portion, such that the first module portion and the second module portion adhere to each other,
    wherein the at least one through hole penetrates through the adhesive base layer, and stops at interfaces between the adhesive base layer and the first module portion and the second module portion.

13. The manufacturing method of a flexible module according to claim 12,
    wherein the filler comprises at least one material selected from the group consisting of a liquid lubricant material, a semi-solid lubricant material and a solid lubricant material.

14. The manufacturing method of a flexible module according to claim 13, wherein the filler comprises at least one selected from the group consisting of round ball structures having a nano-scaled or micron-scaled diameter and grease.

15. The manufacturing method of a flexible module according to claim 13, wherein the filler comprises conductive gold balls.

16. The manufacturing method of a flexible module according to claim 12, wherein protective films are provided on the first surface and the second surface of the adhesive base layer respectively,
    wherein the at least one through hole also penetrates through the protective films,
    wherein the manufacturing method further comprises:
    prior to attaching a first surface of the adhesive base layer to a first module portion, stripping the protective film on the first surface of the adhesive base layer, and
    prior to attaching a second surface of the adhesive base layer opposite to the first surface to a second module portion, stripping the protective film on the second surface of the adhesive base layer.

17. The manufacturing method of a flexible module according to claim 16, wherein the step of performing a patterning process by punching at least one through hole in a bending load buffer region of an adhesive base layer comprises:

punching the adhesive base layer through the protective films by using a punching die with a pillar, so as to form a plurality of through holes distributed in an array.

* * * * *